(12) United States Patent
Tsai et al.

(10) Patent No.: US 7,982,993 B1
(45) Date of Patent: Jul. 19, 2011

(54) DISK DRIVE EMPLOYING DIFFERENT SERVO TPI TO DATA TPI RATIOS ACROSS THE DISK SURFACE

(75) Inventors: Chun Sei Tsai, Tustin, CA (US); William B. Boyle, Lake Forest, CA (US); Carl E. Barlow, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 196 days.

(21) Appl. No.: 12/340,309

(22) Filed: Dec. 19, 2008

(51) Int. Cl.
G11B 5/09 (2006.01)
G11B 5/596 (2006.01)

(52) U.S. Cl. ...................... 360/48; 360/77.08

(58) Field of Classification Search ............... None
See application file for complete search history.

(56) References Cited

U.S. PATENT DOCUMENTS

| | | |
|---|---|---|
| 4,669,004 A | 5/1987 | Moon et al. |
| 4,771,346 A | 9/1988 | Shoji et al. |
| 4,928,192 A | 5/1990 | Bartlett et al. |
| 4,945,427 A | 7/1990 | Cunningham |
| 5,596,458 A | 1/1997 | Emo et al. |
| 5,739,994 A | 4/1998 | Ottesen et al. |
| 5,777,813 A | 7/1998 | Sun et al. |
| 5,812,755 A | 9/1998 | Kool et al. |
| 5,870,237 A | 2/1999 | Emo et al. |
| 5,930,069 A | 7/1999 | Kim |
| 5,940,237 A | 8/1999 | Takagi |
| 5,949,603 A | 9/1999 | Brown et al. |
| 5,956,196 A | 9/1999 | Hull et al. |
| 6,005,725 A | 12/1999 | Emo et al. |
| 6,052,250 A | 4/2000 | Golowka et al. |
| 6,084,738 A | 7/2000 | Duffy |
| 6,091,559 A | 7/2000 | Emo et al. |
| 6,105,104 A | 8/2000 | Guttmann et al. |
| 6,118,604 A | 9/2000 | Duffy |
| 6,130,796 A | 10/2000 | Wiselogel |
| 6,137,644 A | 10/2000 | Hetzler et al. |
| 6,172,839 B1 | 1/2001 | Ahn |
| 6,182,250 B1 | 1/2001 | Ng et al. |
| 6,195,218 B1 | 2/2001 | Guttmann et al. |
| 6,235,934 B1 | 5/2001 | Caringi et al. |
| 6,256,160 B1 | 7/2001 | Liikanen et al. |
| 6,262,857 B1 | 7/2001 | Hull et al. |
| 6,317,285 B1 | 11/2001 | Bi et al. |
| 6,396,654 B2 | 5/2002 | Jeong et al. |
| 6,441,981 B1 | 8/2002 | Cloke et al. |
| 6,466,387 B1 | 10/2002 | Ogasawara et al. |
| 6,493,176 B1 | 12/2002 | Deng et al. |

(Continued)

OTHER PUBLICATIONS

U.S. Appl. No. 11/957,616, filed Dec. 17, 2007, 22 pages.

(Continued)

Primary Examiner — Daniell L Negrón
Assistant Examiner — Regina N Holder

(57) ABSTRACT

A disk drive is disclosed having a first disk surface, and a head actuated over the first disk surface. The first disk surface comprises a plurality of servo tracks and a plurality of data tracks. The data tracks of the first disk surface are banded together into a plurality of data zones, including a first data zone and a second data zone. A first servo tracks per inch (STPI) to data tracks per inch (DTPI) ratio of the first data zone is substantially different from a second STPI to DTPI ratio of the second data zone.

20 Claims, 9 Drawing Sheets

U.S. PATENT DOCUMENTS

| | | |
|---|---|---|
| 6,545,836 B1 * | 4/2003 | Ioannou et al. ............ 360/77.06 |
| 6,560,052 B2 | 5/2003 | Ng et al. |
| 6,751,036 B2 | 6/2004 | Quak et al. |
| 6,765,737 B1 | 7/2004 | Lim et al. |
| 6,765,744 B2 | 7/2004 | Gomez et al. |
| 6,778,343 B2 | 8/2004 | Nunnelley |
| 6,943,972 B1 | 9/2005 | Chue et al. |
| 6,950,256 B2 | 9/2005 | Kadokawa |
| 6,956,710 B2 | 10/2005 | Yun et al. |
| 6,957,379 B1 | 10/2005 | Patapoutian et al. |
| 6,969,989 B1 | 11/2005 | Mei |
| 7,012,773 B2 | 3/2006 | Ashikaga et al. |
| 7,031,095 B2 | 4/2006 | Kim et al. |
| 7,046,471 B2 | 5/2006 | Meyer et al. |
| 7,075,743 B2 * | 7/2006 | Nishida et al. ................. 360/48 |
| 7,110,197 B2 | 9/2006 | Cho |
| 7,113,358 B2 | 9/2006 | Zayas et al. |
| 7,145,740 B2 | 12/2006 | Zayas et al. |
| 7,170,700 B1 | 1/2007 | Lin et al. |
| 7,215,514 B1 | 5/2007 | Yang et al. |
| 7,414,808 B2 | 8/2008 | Cho et al. |
| 7,436,610 B1 | 10/2008 | Thelin |
| 7,463,438 B2 * | 12/2008 | Kosugi et al. ................... 360/31 |
| 7,679,851 B1 | 3/2010 | Sun et al. |
| 7,688,540 B1 | 3/2010 | Mei et al. |
| 2002/0039246 A1 | 4/2002 | Ding et al. |
| 2004/0021975 A1 | 2/2004 | Meyer et al. |
| 2004/0136104 A1 | 7/2004 | Chiao et al. |
| 2004/0179292 A1 | 9/2004 | Zayas et al. |
| 2006/0018051 A9 | 1/2006 | Chiao et al. |
| 2006/0164747 A1 | 7/2006 | Lee |
| 2006/0227445 A1 | 10/2006 | Chiao et al. |
| 2007/0064325 A1 | 3/2007 | Bi et al. |
| 2007/0127150 A1 | 6/2007 | Cho et al. |
| 2007/0183077 A1 | 8/2007 | Nakamura et al. |
| 2010/0165496 A1 | 7/2010 | Bergevin |

OTHER PUBLICATIONS

Office Action dated Dec. 23, 2010 from U.S. Appl. No. 12/492,443, 17 pages.

U.S. Appl. No. 12/492,443 to Tsai et al., filed Jun. 26, 2009, 18 pages.

Notice of Allowance dated Apr. 8, 2011 from U.S. Appl. No. 12/492,443, 7 pages.

* cited by examiner

DISK DRIVE EMPLOYING DIFFERENT SERVO TPI TO DATA TPI RATIOS ACROSS THE DISK SURFACE

BACKGROUND

Description of the Related Art

Prior art disk drives employ one or more disks with heads actuated over the respective disk surfaces (e.g., top and bottom surfaces). Each disk surface comprises a plurality of radially spaced, concentric data tracks, wherein each data track comprises a number of data sectors for storing user data. During write operations, the disk drive receives user data and a logical block address (LBA) which is mapped to an absolute block address (ABA) identifying one of the data sectors for storing the user data. The LBA to ABA mapping enables defective data sectors to be mapped to spare data sectors.

Because the disk is rotated at a constant velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of embedded servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 1:
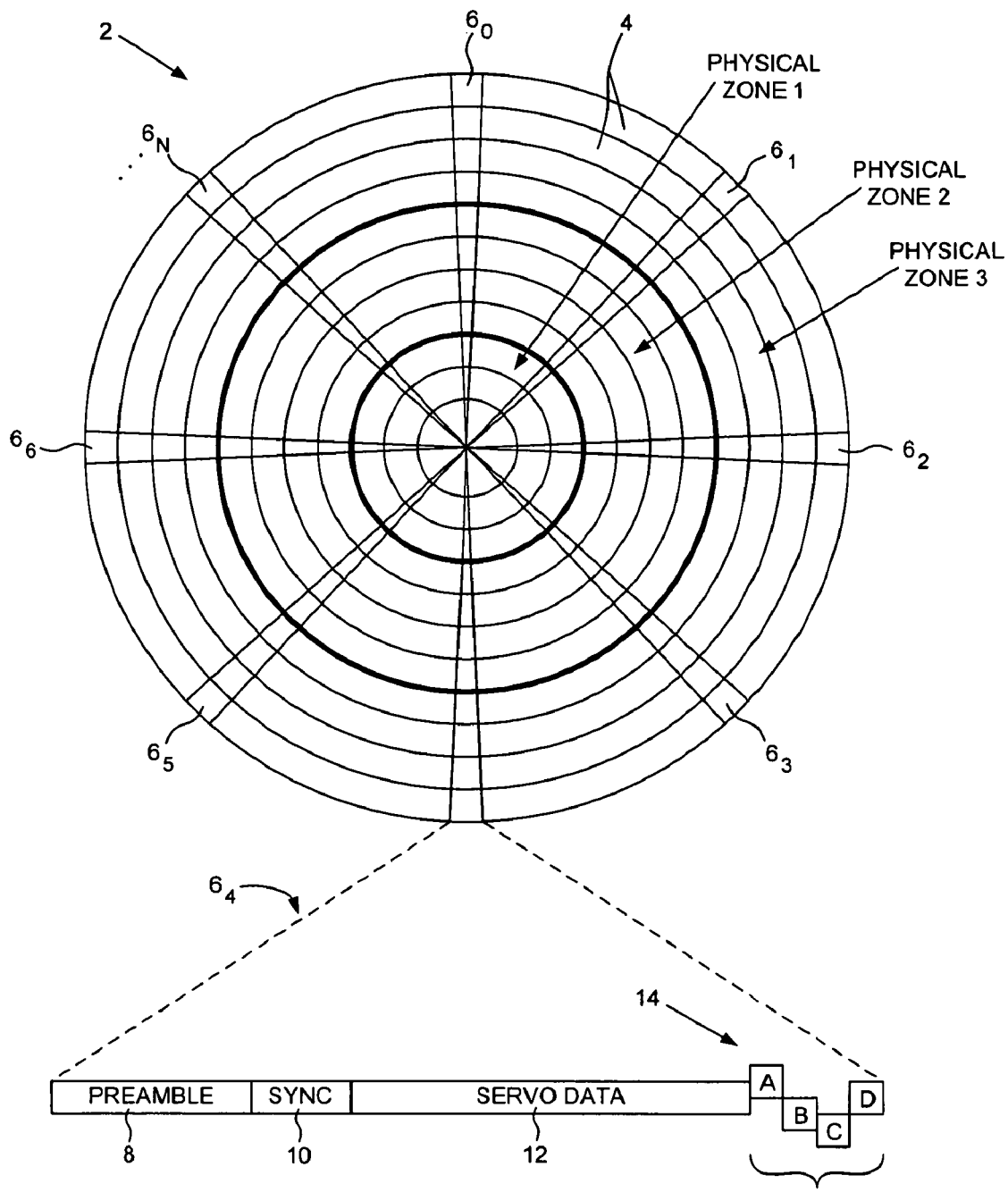
FIG. 1 shows a prior art disk format comprising a plurality of concentric data tracks that are banded together to form a plurality of physical zones.
Figure 2A:
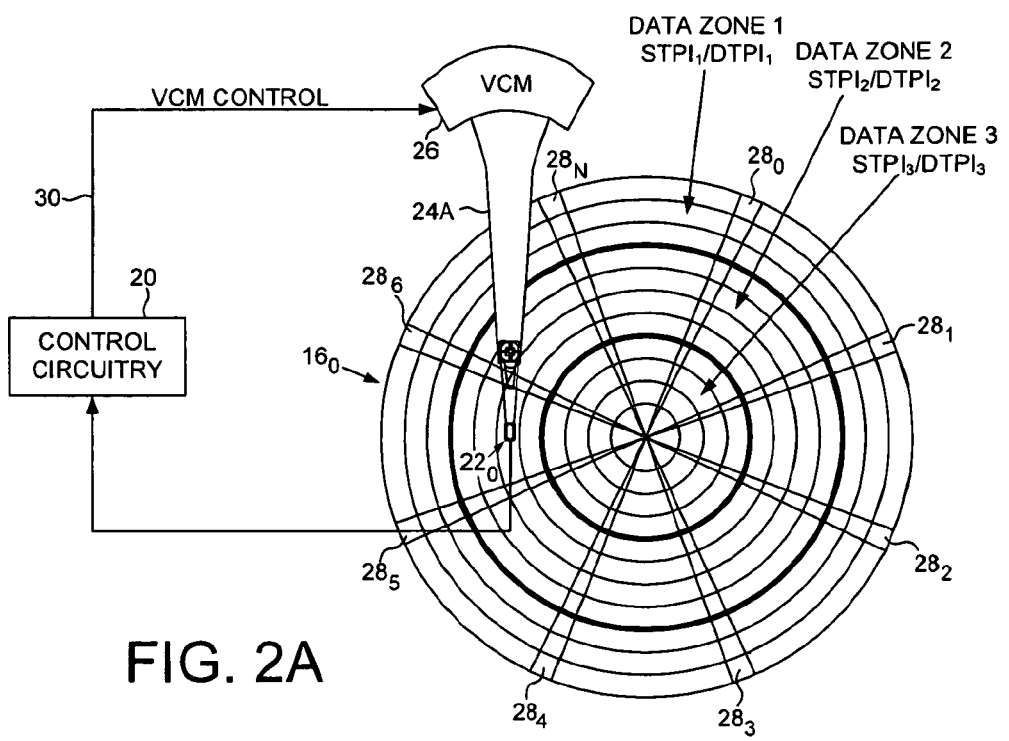
FIGS. 2A and 2B show a disk drive according to an embodiment of the present invention comprising a plurality of disk surfaces and heads actuated over respective disk surfaces, wherein a servo tracks per inch (STPI) to data tracks per inch (DTPI) ratio varies across at least part of a disk surface.
Figure 2B:
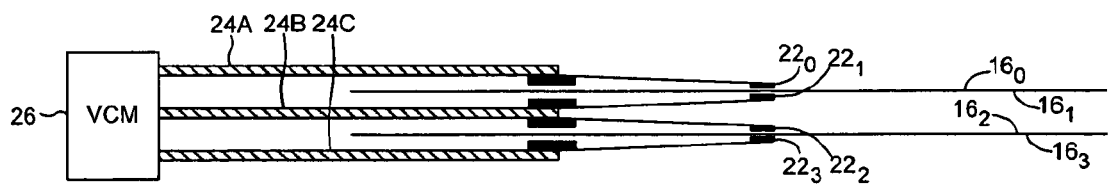
Figure 3:
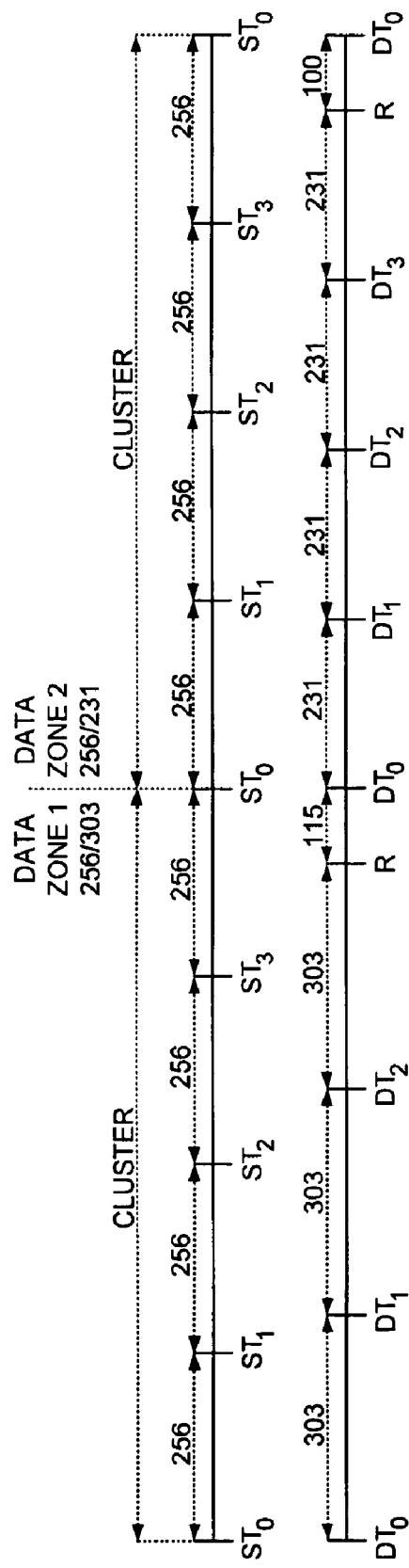
FIG. 3 shows an embodiment of the present invention wherein the control circuitry identifies a number of clusters, and the STPI to DTPI ratio changes between the cluster boundary defining a data zone.

FIGS. 2A and 2B show a disk drive according to an embodiment of the present invention having a plurality of disk surfaces ($16_0$-$16_3$). A first head $22_0$ is actuated over a first disk surface $16_0$, and the first disk surface $16_0$ comprises a plurality of servo tracks and a plurality of data tracks (FIG. 3). The data tracks of the first disk surface $16_0$ are banded together into a plurality of data zones, including a first data zone and a second data zone. A first servo tracks per inch (STPI) to data tracks per inch (DTPI) ratio of the first data zone is substantially different from a second STPI to DTPI ratio of the second data zone.

In the embodiment of FIGS. 2A and 2B, the disk drive comprises a plurality of heads ($22_0$-$22_3$) actuated over respective disk surfaces ($16_0$-$16_3$). The heads ($22_0$-$22_3$) are attached to the distal ends of actuator arms (24A-24C) which are rotated about a pivot by a voice coil motor (VCM) 26 in order to position the heads ($22_0$-$22_3$) over the disk surfaces ($16_0$-$16_3$). Each disk surface ($16_0$-$16_3$) comprises a number of servo sectors ($28_0$-$28_N$) that store coarse head position information (e.g., a track address) used to position the head over a target data track during a seek operation, and fine head position information (e.g., servo bursts) used to maintain the head over the target data track during read/write operations. The control circuitry 20 processes the servo sectors ($28_0$-$28_N$) to generate a VCM control signal 30 applied to the VCM 26 in a closed loop servo system.

FIG. 3 shows the format of servo tracks (ST) relative to the format of data tracks (DT) according to an embodiment of the present invention. In this example, the servo tracks are banded together into a plurality of clusters, where a first cluster is in a first data zone, and a second cluster is in a second data zone. In the example embodiment of FIG. 3, a spacing between each servo track comprises N quantized steps, and a spacing between each data track comprises M quantized steps. Each quantized step corresponds to a discrete position the servo system may position the head between two servo tracks in order to align the head over a target data track. For example, each quantized step may correspond to a digital-to-analog converter (DAC) count in the servo system. In an embodiment described in greater detail below, the relationship between each quantized step and the corresponding offset in physical distance may vary across the disk surface. For example, a quantized step may correspond to a first fraction of an inch near the outer diameter, whereas a quantized step may correspond to a second (greater) fraction of an inch near the middle diameter. In one embodiment, the number of quantized steps between servo tracks remains constant, but the corresponding physical TPI changes across the radius of the disk surface.

Referring again to FIG. 3, in the cluster of the first data zone, there are 256 quantized steps between the centerline of each servo track, and 303 quantized steps between the centerline of each data track. Therefore in the first data zone, the servo quantized steps per track (SQSPT) to data quantized steps per track (DQSPT) ratio is 256/303. In the cluster of the second data zone, there are 256 quantized steps between the centerline of each servo track, and 231 quantized steps between the centerline of each data track. Therefore, the SQSPT to DQSPT ratio is 256/231 in the second data zone. Accordingly, in the example of FIG. 3, the STPI to DTPI ratio of the first data zone is different than the STPI to DTPI ratio of the second data zone.

Any suitable STPI to DTPI ratio may be selected for each data zone. In one embodiment, the STPI to DTPI ratio is constant across a data zone. In addition, the STPI to DTPI ratio may be greater than one (higher STPI than DTPI) or less than one (lower STPI than DTPI). In an embodiment described in greater detail below, the STPI to DTPI ratio may be greater than one over a first part of the disk surface, and less than one over a second part of the disk surface.

In FIG. 3 the cluster of the first data zone comprises 4 full servo tracks $ST_0$-$ST_3$ (4×256=1024 steps) and 3 full data tracks $DT_0$-$DT_2$ (with a remainder of 115 steps as shown). The second data zone comprises 4 full servo tracks (4×256=1024 steps) and 4 full data tracks (with a remainder of 100 steps as shown). In this embodiment, each cluster comprises an integer number of servo track spacings and a fractional number of data track spacings. Also in this embodiment, the data tracks are formatted such that the spacing of data tracks always begins relative to the start of a new cluster. In the example of FIG. 3, the spacing between the last data track (data track $DT_2$) of a current cluster and the first data track (data track $DT_0$) of the next cluster includes the remainder (303+115=418 steps). In an alternative embodiment, the remainder is distributed across the data tracks in any suitable manner so that the spacing between data tracks is substantially even.

In the embodiment of FIG. 2A, the data tracks of each disk surface are banded together into a plurality of physical zones each having physical zone boundaries at predetermined radial locations on the disk surface, wherein each physical zone is operable to store data in the data sectors at a predetermined data rate. In one embodiment, the physical zones also define the data zones in that the SQSPT to DQSPT ratio is constant across each physical zone, and varies between physical zones. Accordingly, in one embodiment a data rate of data stored in a data track of a first data zone is different than a data rate of data stored in a data track of a second data zone. In alternative embodiment described in greater detail below, at least one physical zone is further divided into multiple data zones each having a different SQSPT to DQSPT ratio. Thus in this embodiment, a data rate of data stored in a data track of a first data zone may be the same as a data rate of data stored in a data track of a second data zone.

Figure 4:
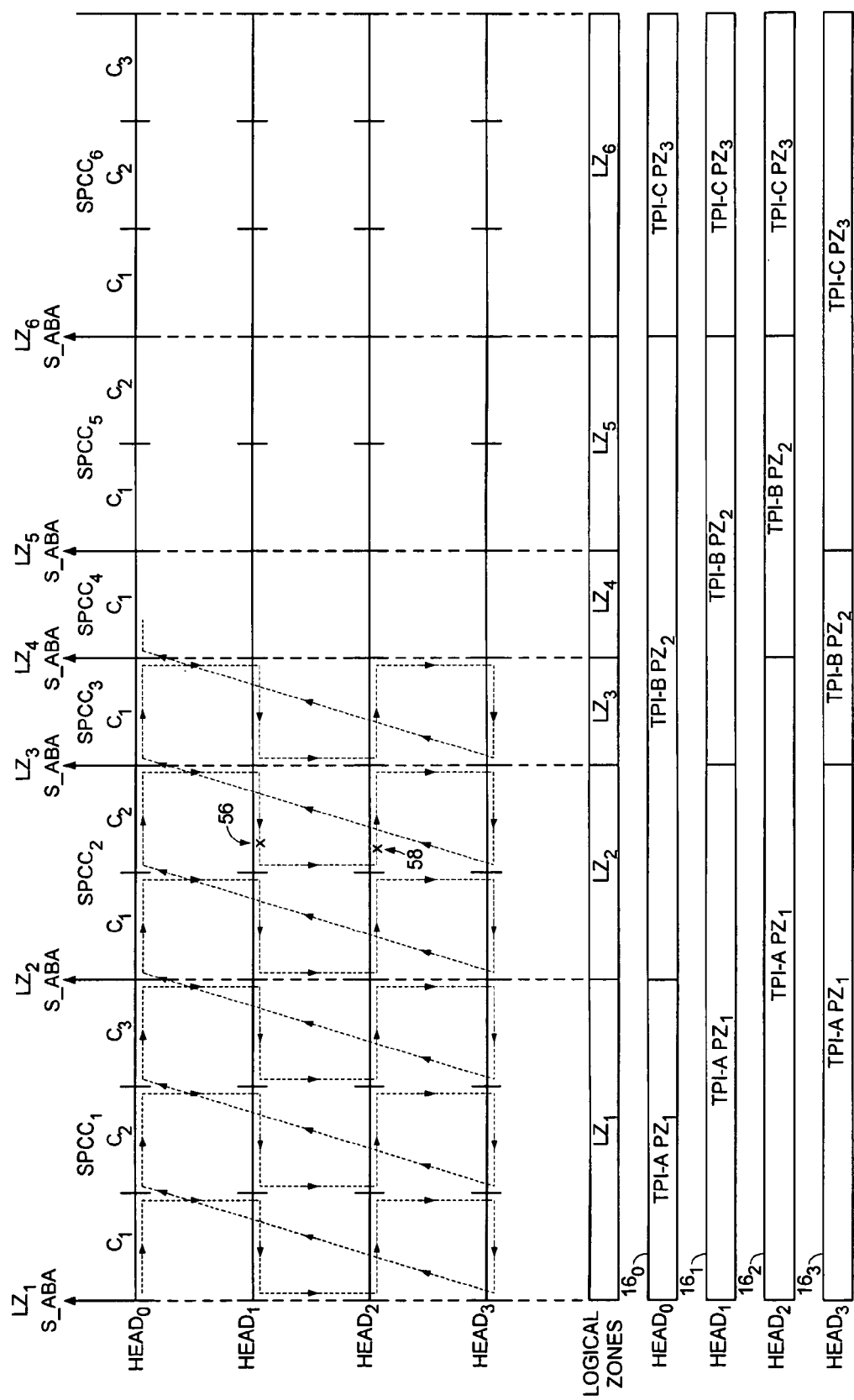
FIG. 4 shows an embodiment of the present invention wherein the physical zone boundaries define logical zone boundaries, the STPI to DTPI ratio is different between at least two of the physical zones, and a numbering for absolute block addresses follows a serpentine pattern along the width of a cluster.

FIG. 4 shows an example format for the disk surfaces ($16_0$-$16_3$) according to an embodiment of the present invention. In this example, each disk surface corresponding to heads $22_0$-$22_3$ comprises three physical zones $PZ_1$-$PZ_3$ having physical zone boundaries at predetermined radial locations. Also in this embodiment, each physical zone corresponds to a data zone having a selected SQSPT to DQSPT ratio. The physical zone $PZ_1$ on disk surface $16_0$ has a physical zone boundary (right boundary) at a first predetermined radial location, wherein the first predetermined radial location is different from any of the radial locations of the physical zone boundaries on disk surface $16_1$. The physical zone $PZ_1$ on the disk surface $16_1$ has a physical zone boundary (right boundary) at a second predetermined radial location, wherein the second predetermined radial location is different from any of the radial locations of the physical zone boundaries on disk surface $16_0$. Logical zone boundaries of logical zones $LZ_1$-$LZ_6$ are defined relative to the physical zone boundaries in that a new logical zone boundary occurs whenever there is a change in any one of the physical zones on any disk surface. Accordingly, in this embodiment the number of logical zones is greater than the number of physical zones for at least one of the disk surfaces (six logical zones and three physical zones in the example of FIG. 4). Preferably, these logical zones are defined for at least two of the disk surfaces, and in one embodiment, one set of logical zones defines the logical zone boundaries for the entire drive.

In one embodiment, the block address received from the host with an access command is a logical block address (LBA) that the control circuitry 20 maps to an absolute block address (ABA) corresponding to a target data sector. This LBA to ABA mapping facilitates the "mapping out" of defective data sectors to spare data sectors. Any suitable LBA to ABA mapping algorithm may be employed in the embodiments of the present invention.

In one embodiment, the ABA numbering follows a suitable serpentine pattern across the disk surfaces. This is illustrated in the embodiment of FIG. 4, wherein the serpentine pattern follows the width of a cluster along a current disk surface in one direction (e.g., OD to ID), and then follows along a cluster width of a next disk surface in the opposite direction (e.g., ID to OD). When the end of the cluster on the last disk surface is reached, the serpentine pattern continues starting with the next cluster on the first disk surface as illustrated in FIG. 4.

Figure 5:
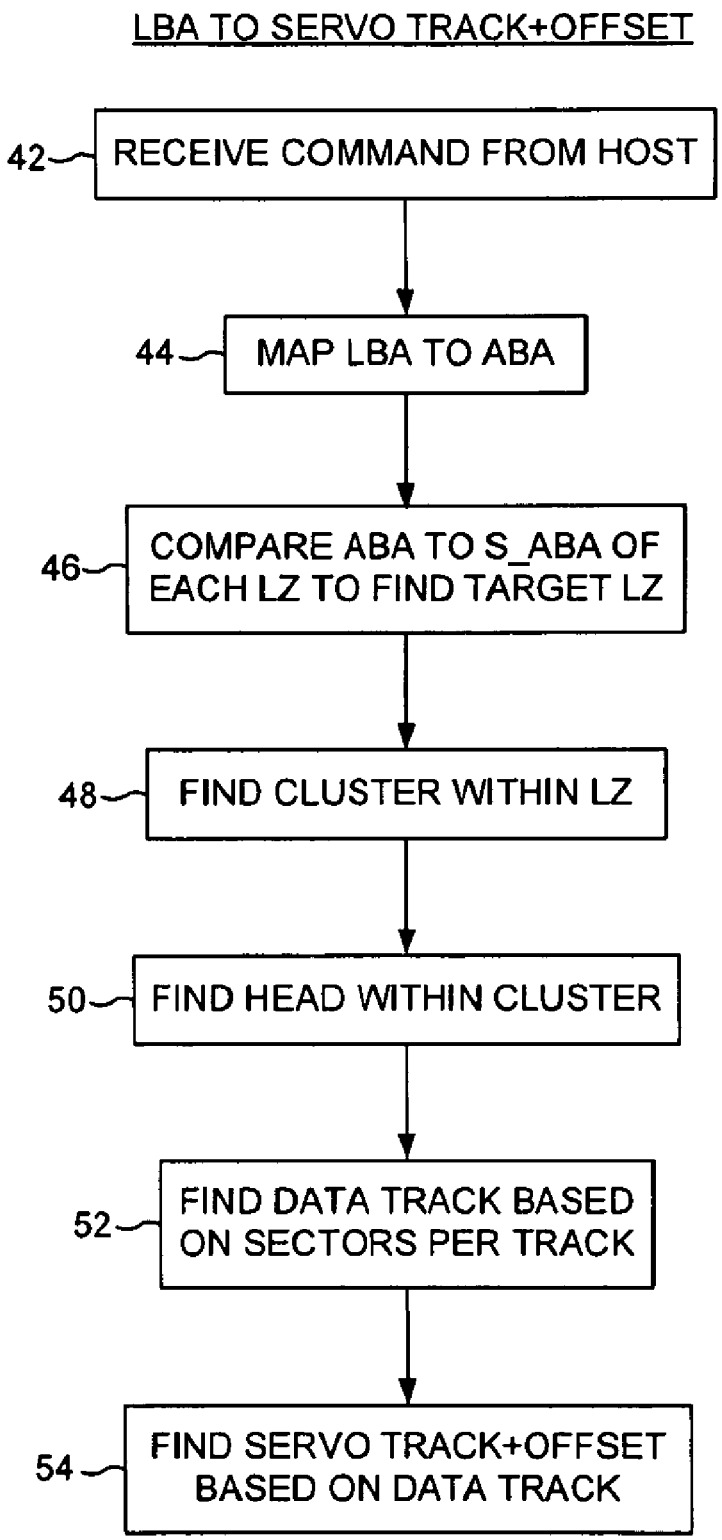
FIG. 5 shows a flow diagram according to an embodiment of the present invention for finding a data sector on a disk surface in response to a block address received from the host by finding the corresponding logical zone, the cluster within the logical zone, the head within the cluster, the data track for the head, and the servo track and servo track offset for the head.

Note that because the data zones do not change within a logical zone in this embodiment, the sectors per cluster cylinder (SPCC) are the same within each logical zone, wherein the SPCC is the number of sectors on all of the disk surfaces within the cluster cylinder. This is true even though the data track density and the linear bit density may be different across the disk surfaces. This constraint enables the convenient mapping of an ABA to a target data sector, which is understood with reference to an embodiment shown in the flow diagram of FIG. 5:

Step 42: Receive access command from host—An access command is received from a host, including a logical block address.

Step 44: Map LBA to ABA—The LBA received from the host is mapped to an ABA using any suitable algorithm.

Step 46: Find the logical zone corresponding to the ABA—Each logical zone has an associated starting ABA (S_ABA), which is computed as the SPCC times the number of clusters within each preceding zone. The logical zone corresponding to any given ABA is found by comparing the starting ABA of each logical zone to the target ABA.

Step 48: Find the cluster within the logical zone corresponding to the ABA—The cluster within the target logical zone is then found by comparing the target ABA to the SPCC for each cluster. For example, the control circuitry may be operable to subtract the starting ABA of the target logical zone from the target ABA to find the remainder, and then subtract the SPCC from the remainder repetitively until the result is less than the SPCC. The fractional SPCC is then used to find the target head/surface in the next step.

Step 50: Find the head within the cluster corresponding to the ABA—Once the cluster within the logical zone is found, the head/surface storing the target data sector is found by comparing the fractional SPCC to the sectors per cluster (SPC) for each disk surface starting with the first disk surface $16_0$. For example, the control circuitry may be operable to subtract the SPC for each disk surface from the fractional SPCC found in the previous step until the result is less than the SPC. The remainder of this step is then used to find the target data track in the next step.

Step 52: Find the data track corresponding to the head and ABA—The target data track is then found by comparing the remainder of the previous step to the sectors per track (SPT) within the cluster on the target disk surface. For example, subtract the sectors per track from the remainder of the previous step until the result is less than the SPT.

Step 54: Find the servo track and a radial offset—Once the target data track is known, the corresponding servo track can be determined using the SQSPT to DQSPT ratio for the corresponding data zone of the disk surface. The centerline of the target data track is typically located at a radial offset (in steps) from the target servo track. In one embodiment, the target servo track and radial offset are always determined relative to the left side of the cluster regardless as to the serpentine direction.

Figure 6A:
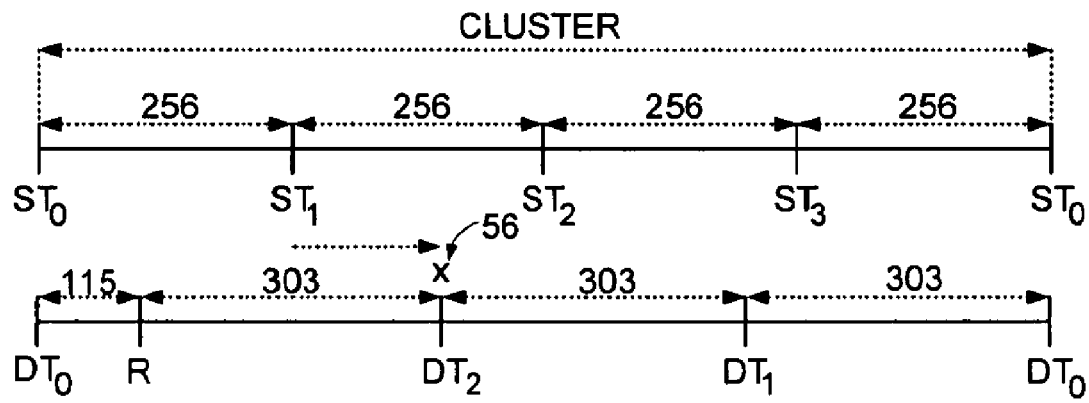
FIGS. 6A and 6B illustrate how a servo track and servo track offset are identified for locating the center of a target data track according to an embodiment of the present invention.

A better understanding of how an ABA may be mapped to a target data sector in one embodiment is understood by considering two examples in FIG. 4, assuming the following format parameters:

$SPCC_1=412 \Rightarrow S\_ABA\ LZ_2=1236$
$SPCC_2=466 \Rightarrow S\_ABA\ LZ_3=2168$
SPC within cluster $C_2$ of $LZ_2$ on disk surface $16_0=124$
SPC within cluster $C_2$ of $LZ_2$ on disk surface $16_1=105$
SPC within cluster $C_2$ of $LZ_2$ on disk surface $16_2=90$
SPC within cluster $C_2$ of $LZ_2$ on disk surface $16_3=147$
SPT within cluster $C_2$ of $LZ_2$ on disk surface $16_1=35$
SPT within cluster $C_2$ of $LZ_2$ on disk surface $16_2=30$ In a first example illustrated in FIG. 6A, a target data sector (reference number 56 in FIG. 4) is found for ABA number 1897. The target logical zone ($LZ_2$) is found by comparing the S_ABA of the logical zones to the target ABA of 1897. A remainder is found by subtracting the S_ABA of the target logical zone (S_ABA $LZ_2=1236$) from the ABA number 1897 leaving a remainder of 661. The target cluster within $LZ_2$ is then found by subtracting the $SPCC_2$ from the remainder of 661 (which happens once in this case before the result is less than $SPCC_2$). The remainder (661−466=195) is then used to find the target head/surface by subtracting the SPC for each disk surface (which happens once in this case before the result is less than the SPC). The remainder (195−124=71) represents the sector number within cluster $C_2$ of $LZ_2$ on disk surface $16_1$. The corresponding target data track and target data sector are then found by subtracting the sectors per track (SPT) within cluster $C_2$ of $LZ_2$ on disk surface $16_1$ (71−35−35=1). Therefore, the target data sector is the second data sector of the third data track (data track $DT_2$ counting from right to left in FIG. 6A) within cluster $C_2$ of $LZ_2$ on disk surface $16_1$. The corresponding servo track and radial offset is then found using the SQSPT to DQSPT ratio (256/303):

Target servo track=((4×256)−(2×303))/256=1 remainder 162.

In the above equation, the number of quantized steps in two data track spacings (2×303) is subtracted from the total number of steps in the cluster (4×256) since the direction of the serpentine pattern is right to left for disk surface $16_1$. Therefore, the target servo track is the second servo track (servo track $ST_1$ counting from left to right in FIG. 6A) within cluster $C_2$ of $LZ_2$ on disk surface $16_1$, and the radial offset from the second servo track is 162 steps as shown in FIG. 6A.

Figure 6B:
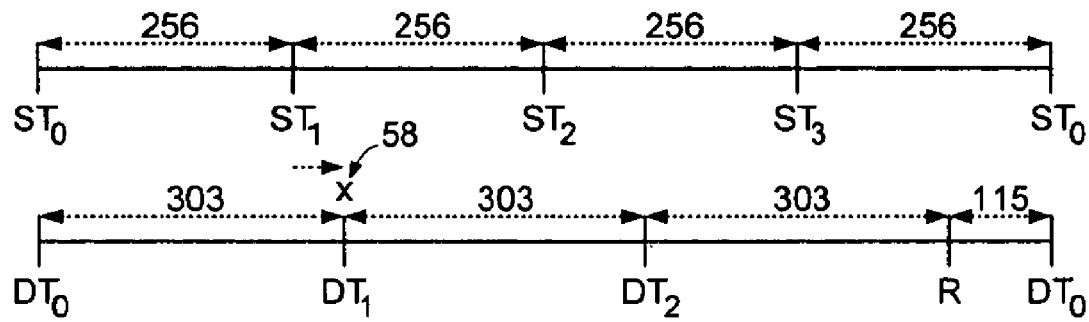

In a second example illustrated in FIG. 6B, the target data sector (reference number 58 in FIG. 4) is found for ABA number 1967. The target logical zone ($LZ_2$) is found by comparing the S_ABA of the logical zones to the target ABA of 1967. A remainder is found by subtracting the S_ABA of the target logical zone (S_ABA $LZ_2=1236$) from the ABA number 1967 leaving a remainder of 731. The target cluster within $LZ_2$ is then found by subtracting the $SPCC_2$ from the remainder of 731 (which happens once in this case before the result is less than $SPCC_2$). The remainder (731−466=265) is then used to find the target head/surface by subtracting the SPC for each disk surface (which happens twice in this case before the result is less than the SPC). The remainder (265−124−105=36) represents the sector number within cluster $C_2$ of $LZ_2$ on disk surface $16_2$. The corresponding target data track and target data sector are then found by subtracting the sectors per track (SPT) within cluster $C_2$ of $LZ_2$ on disk surface $16_2$ (36−30=6). Therefore, the target data sector is the 7th data sector of the second data track (data track $DT_1$ counting from left to right in FIG. 6B) within cluster $C_2$ of $LZ_2$ on disk surface $16_2$. The corresponding servo track and radial offset is then found using the SQSPT to DQSPT ratio (256/303):

Target servo track=(1×303)/256=1 remainder 47.

Therefore, the target servo track is the second servo track (servo track $ST_1$ counting from left to right in FIG. 6B) within cluster $C_2$ of $LZ_2$ on disk surface $16_2$, and the radial offset from the second servo track is 47 steps as shown in FIG. 6B.

In one embodiment, the parameters needed to map a given ABA to a target data sector are stored in a table. For example, the starting ABA for each logical zone, the SPCC for each logical zone, the SPC within each logical zone on each disk surface, the SPT for each cluster on each disk surface, and the SQSPT to DQSPT ratio within each data zone on each disk surface are stored in a table, wherein the appropriate table values are retrieved at each step in the above mapping process.

Figure 7:
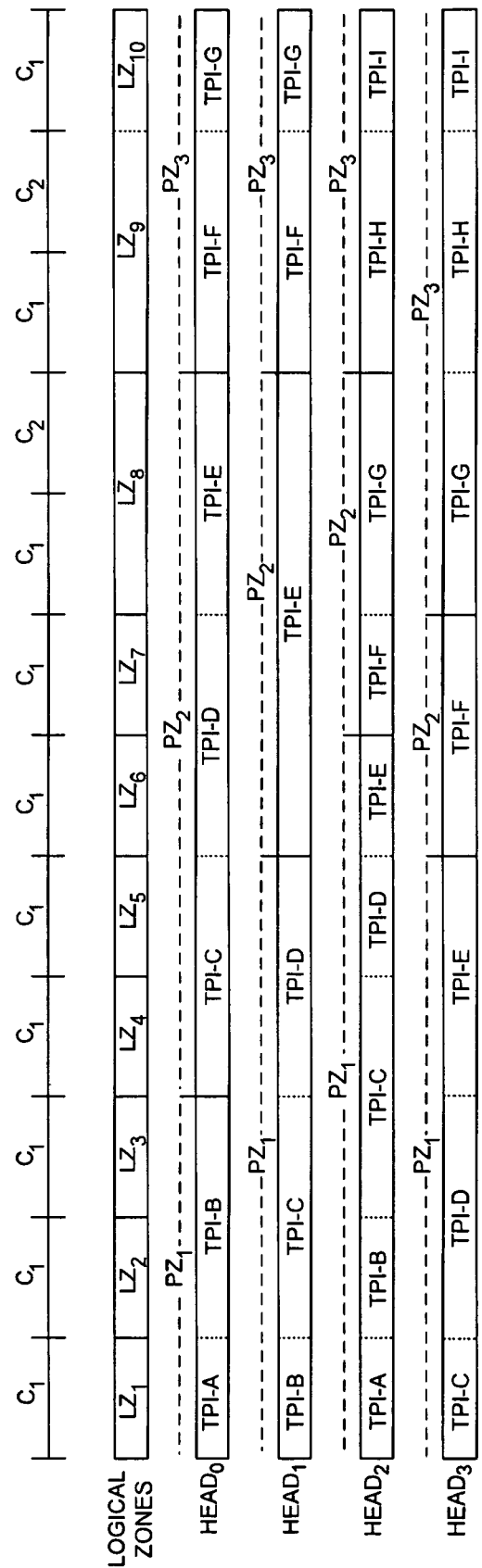
FIG. 7 shows an embodiment of the present invention wherein data zones are defined by the STPI to DTPI ratio which changes within a physical zone, and the logical zone boundaries are defined by the data zone boundaries.

FIG. 7 shows an embodiment of the present invention wherein each physical zone on each disk surface is further divided into two or more data zones, wherein at least two of the data zones within a physical zone comprise different SQSPT to DQSPT ratios. In this embodiment, a new logical zone begins at a boundary of a data zone on any disk surface. Similar to the embodiment described above with reference to FIG. 4, in FIG. 7 the sectors per cluster cylinder (SPCC) are the same within each logical zone which facilitates finding the disk surface and radial location of a target data track.

In the embodiments of FIG. 4 and FIG. 7, the SQSPT is constant across each disk surface. Therefore, changing the SQSPT to DQSPT ratio between two data zones means changing the DQSPT for each data zone. This is illustrated in FIG. 4 and FIG. 7 as changing the TPI for each data zone (e.g., TPI-A, TPI-B, etc.). However, the actual physical TPI may depend on the physical fractional inch corresponding to each quantized step.

Any suitable technique may be employed to select the data TPI profile for each disk surface in the embodiments of the present invention. For example, in one embodiment the data TPI profile may be selected relative to an estimated geometry of each head. In another embodiment, the TPI profile may be selected relative to an optimal track width determined from an average amplitude of the read signal or the bit error rate measured at various radial locations for a varying physical spacing between the center of adjacent data tracks.

Figure 8A:
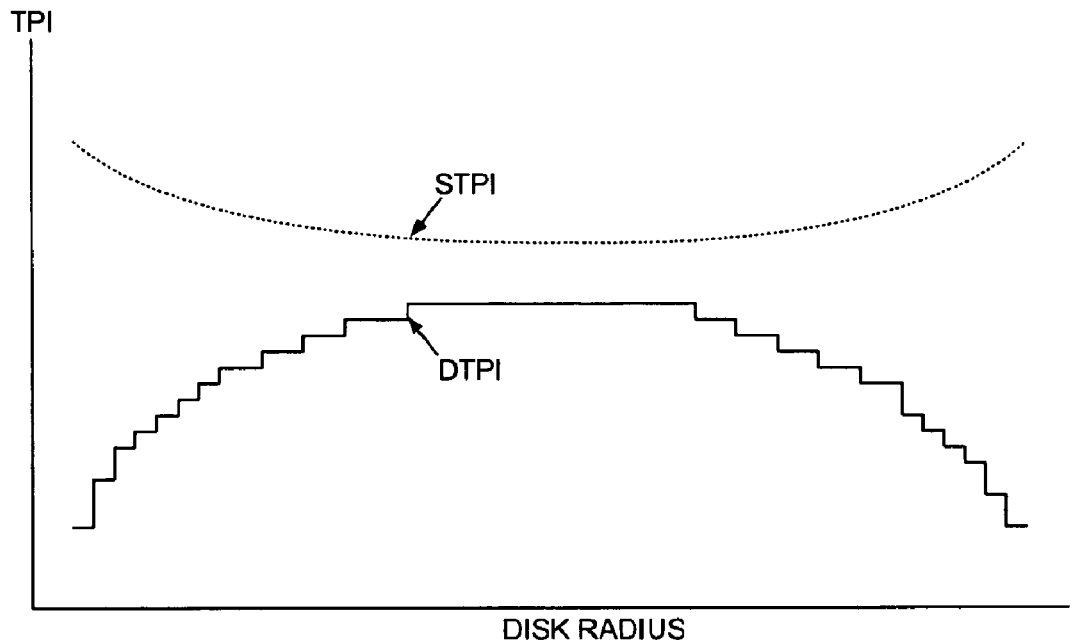
FIG. 8A shows an embodiment wherein a data TPI profile is lower than a servo TPI across the radius of a disk surface.

FIG. 8A shows an example servo TPI profile which increases near the outer and inner diameter of the disk in order to achieve a substantially constant servo track pitch relative to the skew angle of the head. Maintaining a substantially constant servo track pitch may help simplify the servo algorithms, particularly the seek profiles employed in the seek algorithms. However, as illustrated in FIG. 8A the optimal data TPI profile may decrease near the outer and inner diameter of the disk in order to maximize the signal-to-noise ratio. The embodiments of the present invention enable different servo and data TPI profiles such as shown in FIG. 8A by allowing for a change in the STPI to DTPI ratio across the disk surface.

In the embodiment of FIG. 8A, the DTPI is lower than the STPI across the entire radius of the disk surface. In an alternative embodiment shown in FIG. 8B, the DTPI is lower than the STPI over a first part of the disk surface (e.g., near the outer and inner diameter tracks), and the DTPI is higher than the STPI over a second part of the disk surface (e.g., near the middle diameter tracks).

Figure 8B:
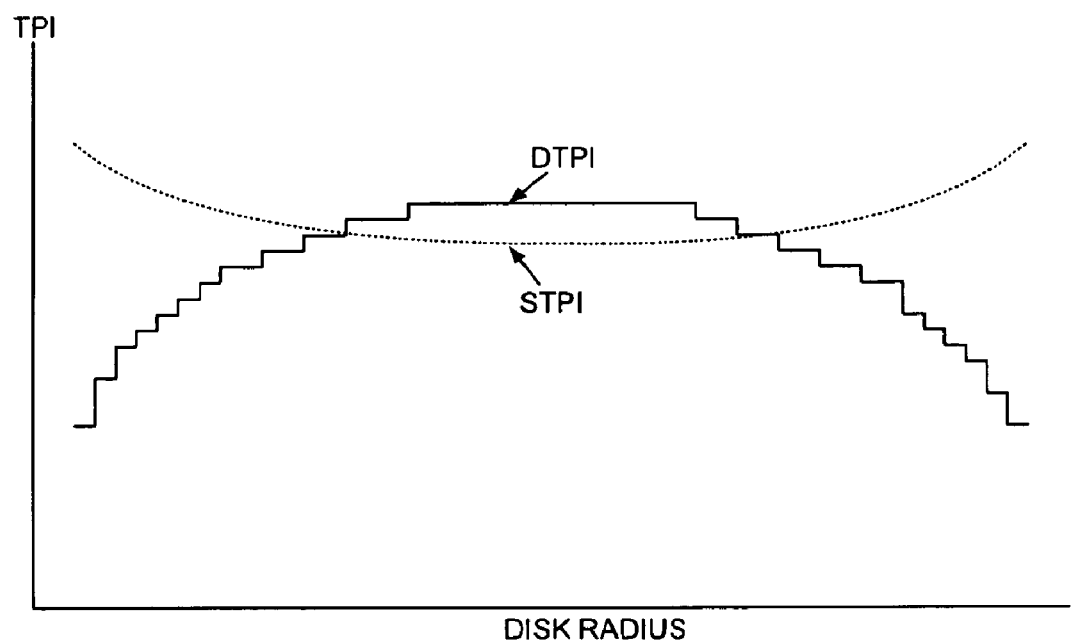
FIG. 8B shows an embodiment wherein a data TPI profile overlaps a servo TPI profile such that the data TPI is higher than the servo TPI for the middle diameter tracks of a disk surface.

In the embodiments of FIGS. 8A and 8B, the STPI profile and the DTPI profile are shown in a dimension of physical tracks per inch. However, as described above, in one embodiment the spacing between all of the servo tracks is represented by N quantized steps (e.g., 256 quantized steps in FIG. 3). In order to achieve a varying physical servo TPI, the quantized steps may represent different fractions of an inch. For example, in FIG. 8A the quantized steps toward the outer and inner diameter servo tracks represent a smaller fraction of an inch in order to increase the physical TPI while maintaining a constant N number of quantized steps between servo tracks.

Figure 9A:
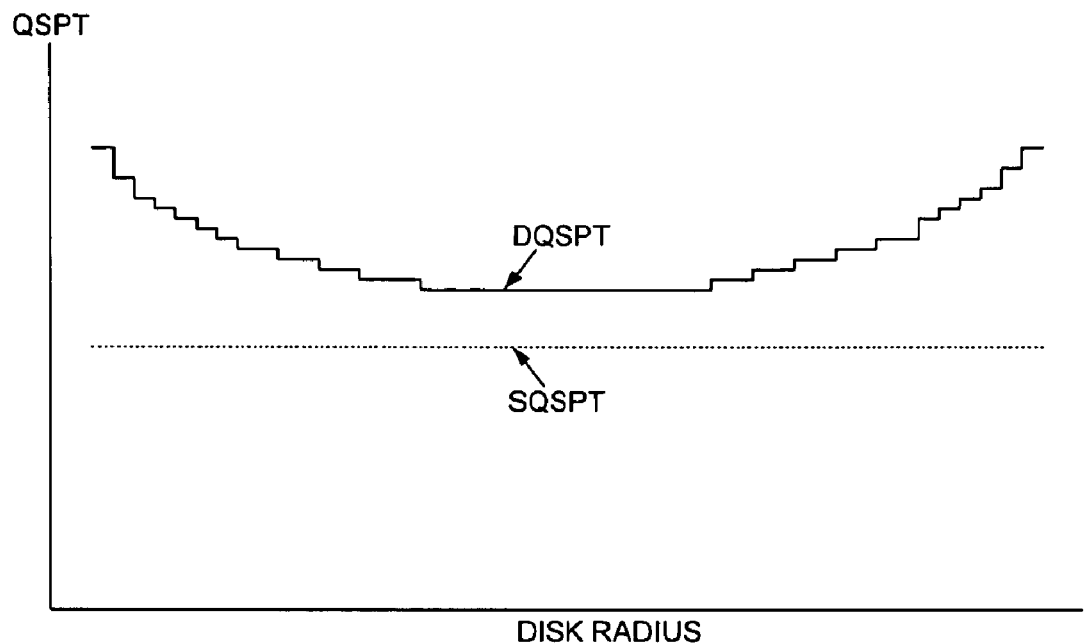
FIGS. 9A and 9B show servo TPI and data TPI profiles in dimensions of quantized steps (e.g., DAC counts) between tracks, wherein the quantized steps between servo tracks is constant across the disk surface and varies between at least two data zones.
Figure 9B:
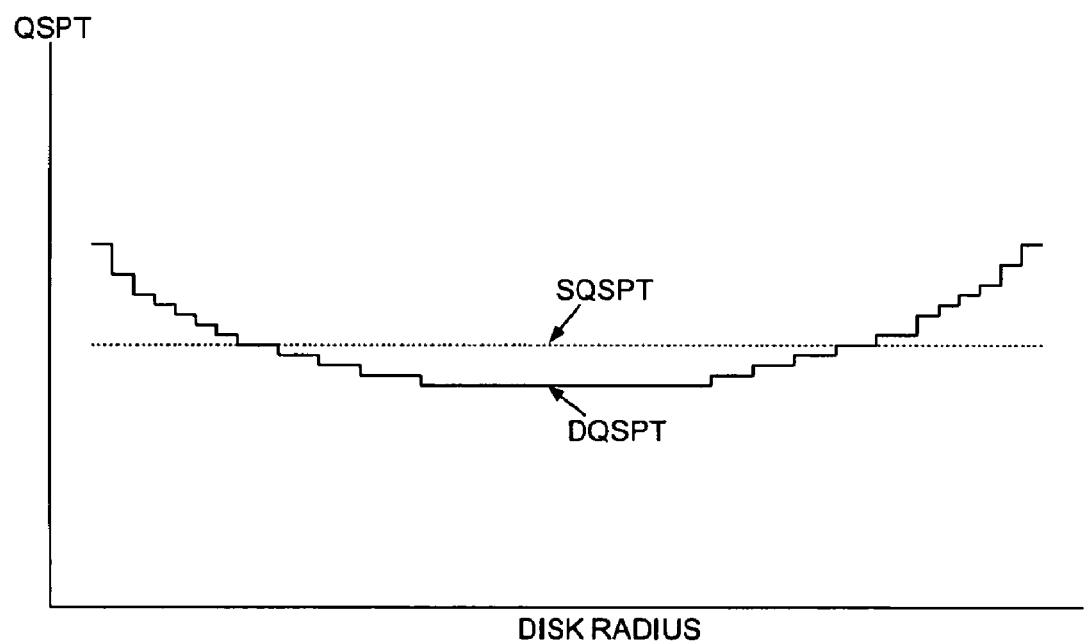

FIGS. 9A and 9B show the STPI and DTPI profiles in a dimension of quantized steps per track (QSPT). Once the physical DTPI profile has been selected for a disk surface, a suitable algorithm is used to convert the physical DTPI profile to a corresponding DQSPT profile such as shown in the figures (the SQSPT profile is a constant in the figures since all servo tracks have a spacing of N quantized steps).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a first disk surface and a first head actuated over the first disk surface; and wherein:
   the first disk surface comprises a plurality of servo tracks and a plurality of data tracks;
   the data tracks of the first disk surface are banded together into a plurality of data zones, including a first data zone and a second data zone;
   a first servo tracks per inch of the first data zone is different from a second servo tracks per inch of the second data zone; and
   a first servo tracks per inch (STPI) to data tracks per inch (DTPI) ratio of the first data zone is substantially different from a second STPI to DTPI ratio of the second data zone.

2. The disk drive as recited in claim 1, wherein the first STPI to DTPI ratio is constant across the first data zone.

3. The disk drive as recited in claim 1, wherein a data rate of data stored in a data track of the first data zone is different than a data rate of data stored in a data track of the second data zone.

4. The disk drive as recited in claim 1, wherein a data rate of data stored in a data track of the first data zone is the same as a data rate of data stored in a data track of the second data zone.

5. The disk drive as recited in claim 1, wherein:
   the servo tracks are banded together into a plurality of clusters; and
   each data zone comprises one or more clusters.

6. The disk drive as recited in claim 1, further comprising a second disk surface and a second head actuated over the second disk surface, wherein:
   the data tracks of the second disk surface are banded together into a plurality of data zones, including a third data zone and a fourth data zone; and
   a first servo tracks per inch (STPI) to data tracks per inch (DTPI) ratio of the third data zone is substantially different from a second STPI to DTPI ratio of the fourth data zone;
   a plurality of logical zones are defined over the radius of the first and second disk surfaces, wherein a new logical zone begins at a boundary of a data zone on either the first or second disk surface.

7. The disk drive as recited in claim 6, further comprising control circuitry operable to:
   receive an access command from a host, the access command comprising a logical block address (LBA);
   map the LBA to a absolute block address (ABA) representing a data sector recorded in one of the data tracks; and
   locate the data sector in response to the ABA and the logical zones.

8. The disk drive as recited in claim 1, wherein the first STPI to DTPI ratio is less than one and the second STPI to DTPI ratio is less than one.

9. The disk drive as recited in claim 1, wherein the first STPI to DTPI ratio is less than one and the second STPI to DTPI ratio is greater than one.

10. A method of operating a disk drive, the disk drive comprising:
  a first disk surface and a first head actuated over the first disk surface wherein:
    the first disk surface comprises a plurality of servo tracks and a plurality of data tracks;
    the data tracks of the first disk surface are banded together into a plurality of data zones, including a first data zone and a second data zone;
    a first servo tracks per inch of the first data zone is different from a second servo tracks per inch of the second data zone; and
    a first servo tracks per inch (STPI) to data tracks per inch (DTPI) ratio of the first data zone is substantially different from a second STPI to DTPI ratio of the second data zone;
  a second disk surface and a second head actuated over the second disk surface, wherein:
    the data tracks of the second disk surface are banded together into a plurality of data zones, including a third data zone and a fourth data zone;
    a first servo tracks per inch of the third data zone is different from a second servo tracks per inch of the fourth data zone;
    a first servo tracks per inch (STPI) to data tracks per inch (DTPI) ratio of the third data zone is substantially different from a second STPI to DTPI ratio of the fourth data zone; and
    a plurality of logical zones are defined over the radius of the first and second disk surfaces, wherein a new logical zone begins at a boundary of a data zone on either the first or second disk surface;
  the method comprising:
    receiving an access command from a host, the access command comprising a logical block address (LBA);
    mapping the LBA to a absolute block address (ABA) representing a data sector recorded in one of the data tracks; and
    locate the data sector in response to the ABA and the logical zones.

11. The method as recited in claim 10, wherein the first STPI to DTPI ratio is constant across the first data zone.

12. The method as recited in claim 10, wherein a data rate of data stored in a data track of the first data zone is different than a data rate of data stored in a data track of the second data zone.

13. The method as recited in claim 10, wherein a data rate of data stored in a data track of the first data zone is the same as a data rate of data stored in a data track of the second data zone.

14. The method as recited in claim 10, wherein:
  the servo tracks are banded together into a plurality of clusters; and
  each data zone comprises one or more clusters.

15. The method as recited in claim 10, wherein the first STPI to DTPI ratio is less than one and the second STPI to DTPI ratio is less than one.

16. The method as recited in claim 10, wherein the first STPI to DTPI ratio is less than one and the second STPI to DTPI ratio is greater than one.

17. A method of defining data tracks on a disk surface of a disk drive, the method comprising:
  writing a plurality of servo tracks on the disk surface at a varying servo tracks per inch (STPI) for defining the data tracks, wherein a first spacing between a first two of the servo tracks comprises N1 number of quantized steps;
  selecting a data tracks per inch (DTPI) profile across the radius of the disk surface, wherein:
    a first spacing between a first two of the data tracks comprises M1 number of quantized steps forming a N1/M1 ratio;
    a second spacing between a second two of the data tracks comprises M2 number of quantized steps forming a N1/M2 ratio; and
    the N1/M1 ratio is different than the N1/M2 ratio.

18. The method as recited in claim 17, wherein substantially all of the servo tracks comprise a spacing of N1 number of quantized steps.

19. The method as recited in claim 17, wherein a second spacing between a second two of the servo tracks comprises N2 number of quantized steps, where N2 is different than N1.

20. The method as recited in claim 17, wherein:
  the servo tracks are banded together into a plurality of clusters;
  the N1/M1 ratio is constant across at least one of the clusters; and
  the N1/M2 ratio is constant across at least one of the clusters.

* * * * *